United States Patent [19]

Ho et al.

[11] 4,110,802
[45] Aug. 29, 1978

[54] CRASH STOP FOR DISC DRIVE ACTUATOR

[75] Inventors: Bin-Lun Ho; Geoffrey M. Lee, both of Los Gatos, Calif.

[73] Assignee: Memorex Corporation, Santa Clara, Calif.

[21] Appl. No.: 800,717

[22] Filed: May 26, 1977

[51] Int. Cl.$^2$ .................. G11B 21/08; G05G 1/04
[52] U.S. Cl. .................................... 360/106; 74/526
[58] Field of Search .................. 360/106, 78; 74/526

[56] References Cited
PUBLICATIONS

Ludma et al., Elastomer Crash Stop for Disk Files, IBM Tech. Disc. Bull., vol. 19, No. 8, Jan. 1977, p. 3175.

*Primary Examiner*—Robert S. Tupper
*Attorney, Agent, or Firm*—Limbach, Limbach & Sutton

[57] ABSTRACT

A crash stop for use in a rotary disc file storage system, particularly for use with a rotary-type electromechanical actuator, the crash stop comprising a dual stop mechanism for delimiting the travel of an actuator arm in either of two reciprocal directions, the stop having two symetrically oriented plain levers having separate spaced pivots, the levers each having first segments projecting from the pivot and adjustably spaced on either side of a stop pin fixed on the actuator arm and second segments oppositely projecting from the pivot and interconnected by a spring loaded, adjustment mechanism, whereby movement of the actuator arm is restricted by contact of the stop pin with one of the first lever segments and limited compression of a spring in the adjustment mechanism.

10 Claims, 4 Drawing Figures

CRASH STOP FOR DISC DRIVE ACTUATOR

BACKGROUND OF THE INVENTION

This invention relates to the field of data processing, magnetic disc storage devices, and in particular, to a mechanical component in the accessing mechanism for safely delimiting the movement of an actuator on the accessing mechanism for preventing damage to either the actuator itself or the recording heads connected to and transported by the actuator. The dual crash stop mechanism of this invention comprises an integral unit for delimiting both the forward and retract movement of the movable component of the accessing mechanism and is particularly suitable for an accessing mechanism of the rotary drive type.

In a computer disc file system, one or more rotating magnetically coated discs are used to store large quantities of information for selective random use by a computer. Since the usefulness of an information storage device is based not only on the capacity and megabyte, cost of the medium, but also on the speed of accessing and retrieving or writing such information, the disc file storage medium has substantial advantages over a magnet tape system in the situation where random rather than sequential accessing is prevalent.

In a disc file system, information is stored along each of a series of closely spaced concentric tracks over the surface of a magnetic disc. The disc has a highly polished uniform composition coating that is discretely magnetizable. One or more recording transducers or heads flies on an air film on the disc carried by the high speed rotation of the disc. Though spaced from the surface of the disc the recording head reads and records binary information on the disc coating by an inductance process. The definition attainable in the magnetization and recognition process determines the bit density and hence the storage capacity of the disc file medium. The design of the recording head, in its electrical dimensional and aerodynamic characteristics, and, the nature of the composition and surfacing of the recording discs are largely determinative of the capacity capabilities of the disc file system. Advanced technology recording heads and recording discs in controlled environment systems have enabled data densities of 6,000 bits per inch at 300 tracks per inch to be achieved.

Coupled with the capacity of the disc file, the access or retrieval time determines the efficiency of the system. The major factor affecting the access time is the speed at which the recording head can move from one track position to another. Advanced low mass accessing and actuator assemblies have reduced average access time to 30 ms. At such seek times, the accessing mechanisms undergo high accelerations and decelerations within small displacements. The servo systems controlling the movement of the recording head are complex and, as in any electrical system, have the inherent possibility of failure, regardless how remote the possibility may be. In such event, an emergency mechanical apparatus is necessary to stop the travel of the accessing mechanism to avoid damage to the actuator, the heads or the disc file.

In prior art systems, two stop mechanisms are spaced at each limit position of the actuator or alternately at limit positions of some other component of the accessing mechanism. Customarily, such stops each have a buffer, such as a coil spring, to brake the movement of the accessing mechanism before the stop. In the present invention the stop, commonly termed a crash stop, is constructed and situated such that a single integral unit provides the limit stops for both directions of travel of the accessing mechanism. This stop mechanism is best used in a rotary type actuator accessing mechanism.

SUMMARY OF THE INVENTION

The crash stop of this invention was devised to provide a single unit delimiting the bi-directional travel of the accessing mechanism in a disc file system. The stop is designed to operate most advantageously on a rotary actuator drive as differentiated from the more commonly used linear actuator. The actuator comprises a voice coil-type motor that includes a permanent magnet circuit which co-acts with an electromagnetic circuit to move an armature connected to a head-arm accessing assembly. In the rotary unit, the armature is pivotally supported with a coil arm segment engaging a magnet structure and an extension arm segment supporting a bank of recording heads positioned over the surface of the disc. A pin located on the armature displaced from the point of pivot is employed as a contact stop for a crash stop mechanism mounted on the actuator. The crash stop mechanism is an integral dual stop device for delimiting the travel of the armature or actuator arm in either of its two reciprocal directions. The stop mechanism has two symmetrically oriented plain levers mounted on two spatially displaced pivots. First segments of each lever project from the pivots and are spaced on each side of the stop pin positioned for contact with the pin on overtravel of the actuator arm. Second segments of each lever project from the opposite side of the pivot and are interconnected by a spring loaded adjustment mechanism. The pivotal movement of the actuator arm is restricted by contact of the stop pin with one or the other of the first lever segment and limited compression of a compression spring in the adjustment mechanism. The distance of compression is fixed by a limit stop in the adjustment mechanism which includes an adjustment control for positioning the first segments with respect to the stop pin. The preferred embodiment of the crash stop is shown in the drawing and described in greater detail hereafter.

DETAILED DESCRIPTION OF THE PREFERRED EMBODIMENT

Figure 1:
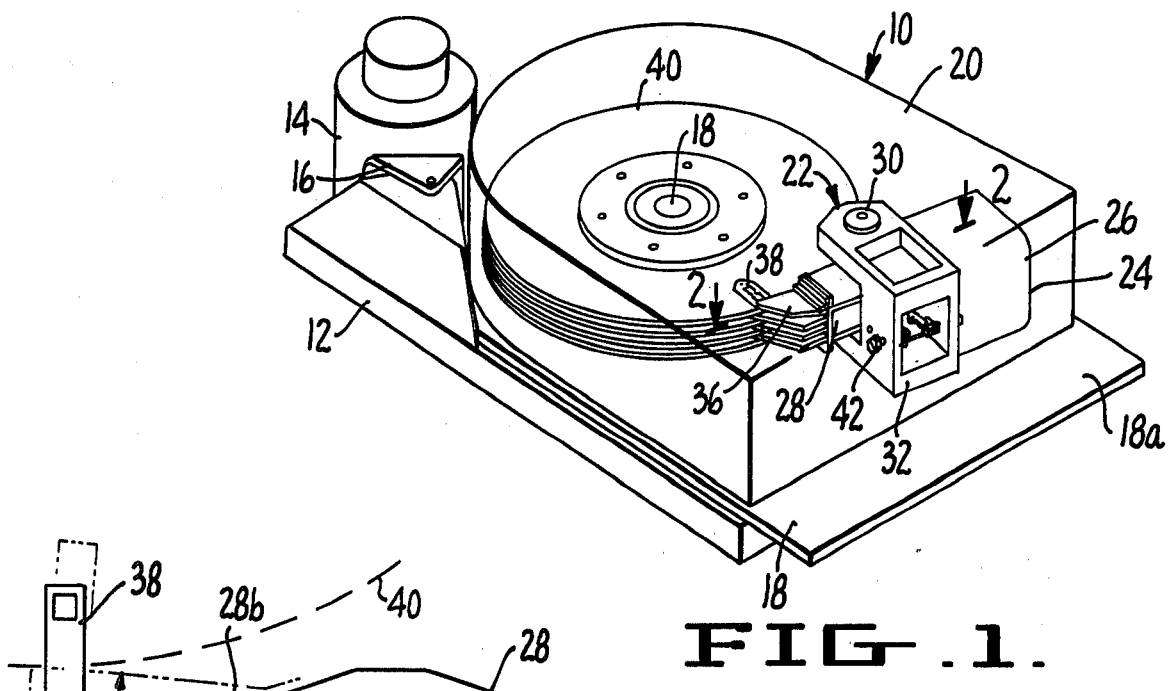
FIG. 1 is a perspective view of the accessing mechanism and discs of a disc file system.

Referring to FIG. 1, a disc file component 10 of a rotary disc file storage system is shown in perspective. The disc file component 10 includes the basic mechanical elements for storing and retrieving binary information on a magnetic disc medium. The file component comprises a frame 12 on which is mounted a high speed electrical motor 14 by adjustment bracket 16. A deck plate 18, detachably mounted to the frame 12 has a transparent enclosure cover 20, which creates an internal environment with a closed-loop, controlled filter system. Within the enclosure cover 20 mounted on the deck plate 18 is an accessing mechanism 22 comprising a rotary actuator 24 and accessory components. The actuator 24 has a permanent magnet structure 26 which co-acts with a coil wound armature 28 supported on a pivot post 30 which is part of a pivot housing 32. The armature 28 has a projecting actuator arm portion 34 which is connected to a bank of disc file accessing arms 36. Each of the accessing arms 36 has one or more spring loaded recording head assemblies 38 connected to it for scanning the surfaces of a fixed disc array 40. The disc array 40 comprising a plurality of spaced, magnetic coated discs, it rotated to a high operating speed by the motor 14 which is belt connected to the spindle 18 of the disc array under the deck plate.

The recording head assemblies 38 include a transducer, not visible, which records and reads binary information on a series of concentric tracks on the surface of the discs. In the embodiment preferred, the transducer is positioned by a closed-loop servo system keyed to prerecorded servo tracks on one surface of the several discs. The remaining surfaces are devoted to storing data. The recording heads or transducers operating over the data surfaces follow the transducer on the servo surface as a result of the fixed bank arrangement of the accessing arms 36.

Electronics (not shown) for operating and controlling the disc file component 10 may be mounted on the deck plate extension 18a or elsewhere on the storage system. Because the capability of the system is based on not only the storage capacity but also the speed of accessing, the actuator 24 is operated at high velocities and accelerations. The potential for damage to heads or actuator during a high speed seek that failed to decelerate because of an electrical malfunction or other cause, requires a mechanical safety stop to decelerate and halt the movement of the accessing mechanism armature and attached head-arm assemblies.

Figure 2:
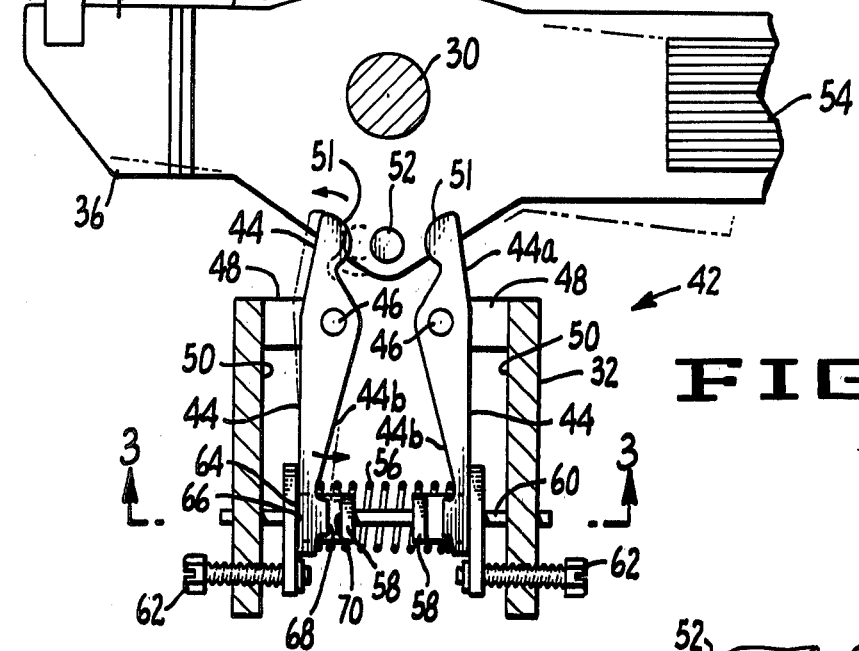
FIG. 2 is a cross-sectional view of the crash stop mechanism and actuator arm taken on the lines 2—2 in FIG. 1.

The preferred construction of the dual stop mechanism 42 for use with a disc file component as shown in FIG. 1 is illustrated most clearly in FIG. 2. The stop mechanism 42 or crash stop is mounted to the pivot housing 32 as shown in FIG. 1. The crash stop comprises a pair of plain levers 44 pivotally supported on pivot pins 46 mounted on brackets 48 projecting from opposite sides of the inner walls 50 of the pivot housing 32. While a single pivot pin may be used, it is preferred that separate spaced pins be used for symmetry and geometrical positioning of the levers. The levers have first segments 44a projecting from the pivot pins 46 and have a contact face 51 on either side of a stop pin 52 fixed to the armature 28 of the actuator.

The armature 28, as shown in FIG. 2, is a casting pivotally connected to the pivot post 30. One arm 28a of the lever includes a coil 54 which co-acts with the magnet structure 26 shown in FIG. 1 to move and position the armature in response to a current with coil 54. The other arm 28b connects to the bank of accessing arms 36, which supports the spring loaded head assemblies 38 over the disc surfaces. The armature 28 rotates on the pivot post 30 within a small arc in the order of 15°. The lever arm 28b and accessing arm 36 translates this small arcuate movement to a relatively large displacement at the location of the recording head assemblies 38.

Figure 3:
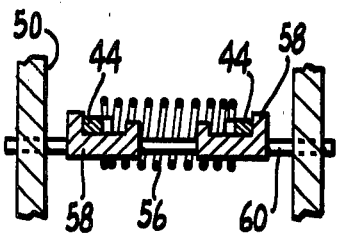
FIG. 3 is a cross-sectional view of the crash stop taken on the lines 3—3 in FIG. 2.
Figure 4:
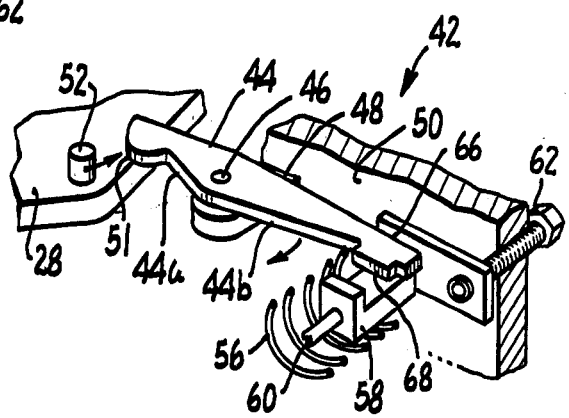
FIG. 4 is a partial perspective view of the crash stop.

The stop pin 52 is spaced from the pivot post 30 such that it has a defined displacement in a reciprocal course during normal seek operations of the accessing mechanism. Each lever 44 has a contact face 51 positioned on the course of the stop pin 52 on each side of the pin. In the embodiment shown with a rotary actuator, the course is arcuate. However, the crash stop arrangement is suitable, though less desirable, for the longer linear course of a linear actuator. Within the predefined limits of the seek operations, the stop pin 52 does not strike the contact face 51 of either of the first segments 44a of the levers of the crash stop mechanism 42. The levers 44 have second segments 44b extending in an opposite direction from the first segments 44a. The second segments 44b are interconnected by a compression spring 56 and limited in travel by stop brackets 58, shown also in FIGS. 3 and 4. The stop brackets 58 are slidably connected to the inner walls 50 of the pivot housing by a slide pin 60 and a separate adjustment screw 62 for each bracket. The adjustment screw 62 permits the position of the stop brackets 58 and hence the location of the contact faces 51 to be adjusted for optimum positioning of the contact faces with respect to the arcuate course of the stop pin 52 on the armature. Because of the bracketing effect of the stop bracket, the maximum pivotal displacement of the levers 44 is fixed regardless of the positioning of the stop brackets by the adjustment screws 62.

In an emergency situation where the armature overshoots its normal limits, the stop pin 52 strikes the contact face of one of the levers and moves the lever as shown in phantom in FIG. 2. In such case, the spring is compressed providing an increasingly reactant force to counter the momentum of the armature, hence decelerating the armature significantly before the end of the lever contacts the stop bracket 58 thereby halting further travel of the lever as well as the armature. The motion of travel of the lever 44 is schematically illustrated by the directional arrows in FIG. 4. Normally, as illustrated, the levers 44 by force of the compression spring are positioned with their back edge 64 or heel against the outer face 66 of the stop bracket 58. On contact of the stop pin 52, the levers compress the spring and displace until the front edge 68 contacts the inner face 70 of the stop bracket.

The adjustment screws allow the crash stop to be adjusted after the disc file component is assembled and the operating limits defined.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

What is claimed is:

1. In a disc file having an accessing mechanism including an actuator having a reciprocal movable member with connected recording heads for accessing the surface of a magnetic disc, a crash stop for restraining the reciprocal displacement of the moving member of the actuator comprising:

a contact element mounted on the movable member of the actuator and movable in a generally reciprocal course with the movable member;

contact means having first and second opposed contact faces;

pivot means mounted to a stationary structure in said disc file for pivotally mounting said contact means to said structure with said contact faces positioned on the course of said contact element displaced from opposite sides of said contact element; and, bias means attached to said contact means co-acting with said contact faces for restraining displacement of said contact faces, whereby displacement of the actuator moving member may be restrained.

2. The crash stop of claim 1 comprising further, stop means for limiting the displacement of the contact faces.

3. The crash stop of claim 2 further comprising adjustment means cooperating with said stop means for adjusting the position of the stop means and the contact faces, whereby the displacement of the contact faces may be limited to a predetermined displacement for all adjustment positions of the contact faces.

4. The crash stop of claim 1 wherein said contact means comprises a pair of plain levers.

5. The crash stop of claim 4 wherein said pivot means comprises at least one pivot pin, said levers being pivotally connected to said pivot pin.

6. The crash stop of claim 5 wherein said pivot means comprised a pair of spaced pivot pins, said levers being pivotally connected to said pivot pins.

7. The crash stop of claim 6 wherein said levers have first ends, at which said contact faces are located, displaced from their respective said pivot pins and second ends displaced from said respective pivot pins and mutually engageable with said bias means.

8. The crash stop of claim 7 wherein said bias means comprises a compression spring positioned between said second ends of said levers.

9. The crash stop of claim 8 comprising further, adjustment means comprising a pair of spaced stop elements each engageable with a said second end of said levers, said stop elements each having cooperating screw means for discretely adjusting the position of said stop elements and contact faces.

10. The crash stop of claim 9 wherein said stop elements each have a pair of fixedly spaced stop faces selectively contactable with a said second end of said levers for limiting the displacement of the contact faces to a predetermined displacement for all adjustment positions of the contact faces.

* * * * *